(12) United States Patent  (10) Patent No.: US 6,661,433 B1
Lee  (45) Date of Patent: Dec. 9, 2003

(54) PORTABLE WARDROBE PREVIEWING DEVICE

(75) Inventor: Joseph H. Lee, Foothill Ranch, CA (US)

(73) Assignee: Gateway, Inc., Poway, CA (US)

( * ) Notice: Subject to any disclaimer, the term of this patent is extended or adjusted under 35 U.S.C. 154(b) by 544 days.

(21) Appl. No.: 09/706,169

(22) Filed: Nov. 3, 2000

(51) Int. Cl.[7] ............................................... G06K 15/00
(52) U.S. Cl. ...................................... 345/764; 235/383
(58) Field of Search ................................ 345/762, 765, 345/764; 235/378, 381, 383, 385

(56) References Cited

U.S. PATENT DOCUMENTS

| 4,486,774 A | | 12/1984 | Maloomian |
| RE33,054 E | | 9/1989 | Markham |
| 5,651,677 A | | 7/1997 | Hildebrandt |
| 5,813,153 A | | 9/1998 | Maglio |
| 5,930,769 A | | 7/1999 | Rose |
| 5,979,757 A | | 11/1999 | Tracy et al. |
| 5,979,941 A | * | 11/1999 | Mosher, Jr. et al. ........ 235/462 |
| 5,986,718 A | * | 11/1999 | Barwacz et al. ............ 348/592 |
| 6,386,448 B1 | * | 5/2002 | Addy ......................... 235/383 |

* cited by examiner

Primary Examiner—Cao (Kevin) Nguyen
(74) Attorney, Agent, or Firm—Scott Charles Richardson; Mark S. Walker

(57) ABSTRACT

The present invention provides for a wardrobe previewing system that allows a person to preview how clothing items will look on her without having to put on the clothing items. The wardrobe previewing system includes a portable device, clothing tags for identifying clothing items, and a means for storing clothing item images. The portable device further includes a scanner capable of reading the clothing tags, a display, and an application software for enabling the portable device to display a preview of clothing items on the person. In addition, an image of the person is stored in the memory of the portable device. The person scans the clothing tag of a potential clothing item with the scanner, and retrieves a clothing item image corresponding to the scanned clothing item. The application software overlays the retrieved clothing item image onto the image of the person stored in the memory of the portable device to produce a composite image. The application software then displays the composite image on the display of the portable device to give the person a preview of how the clothing item will look on her.

22 Claims, 5 Drawing Sheets

PORTABLE WARDROBE PREVIEWING DEVICE

BACKGROUND OF THE INVENTION

The field of the invention is clothing, and, more specifically, a portable device for allowing a person to quickly preview how clothing items will look on him or her without having to put on the clothing items.

When shopping at a clothing store, a person will often try on many different clothing items before finding one that looks good on him. This process often involves time-consuming trips to the fitting room in which the person puts on different clothing items and stands in front of a mirror to see how the clothing items look on him. In addition, this process can be time consuming for store employees who often have to reshelve or re-hang clothing items left in the fitting room by a person who decided he does not want them. Furthermore, trying on articles of clothing does not allow the person to see how they will look with clothing items in his existing wardrobe at home. This can be especially troublesome if the person is shopping for clothing items to match or coordinate with clothing items in his existing wardrobe at home.

SUMMARY OF THE INVENTION

The present invention provides for a wardrobe previewing system that allows a person to quickly preview how clothing items will look on her without having to put on the clothing items. The system also allows the person to preview how clothing items at the store will look with clothing items in her existing wardrobe at home.

In one embodiment of the invention, the wardrobe previewing system includes a Personal Digital Assistant (PDA) with wireless Internet capability, clothing tags for identifying clothing items at the store, and a remote database for storing clothing item images. The PDA preferably includes a scanner capable of reading the clothing tags, a display, and application software for enabling the PDA to display a preview of clothing items on the person. In addition, a predefined image of the person is stored in the PDA's memory. In a preferred embodiment, each clothing manufacturer will associate the image of the clothing item for a predefined pose. Accordingly, by having the person capture and store an image of the person in the predefined pose, the overlay of the clothing items will fit better over the image of the person. It is understood in the art that advanced software programming could be utilized to allow for the clothing image to automatically be sized and proportioned to fit better over the predefined image of the person.

At the store, the person scans the clothing tag of a potential clothing item with the scanner. The PDA application software then transmits the identification of the scanned clothing item from the PDA to the database via a wireless Internet link. The database retrieves a clothing item image corresponding to the scanned clothing item, and transmits the retrieved clothing item image to the PDA. The PDA application software overlays the retrieved clothing item image onto the image of the person stored in its memory to produce a composite image. The PDA application software then displays the composite image on the display to give the person a preview of how the clothing item will look on her.

To preview how a clothing item at the store will look with a clothing item in her existing wardrobe, the person simply scans and saves the clothing images of her various clothing items in her existing wardrobe into the PDA memory. This enables the PDA application software to produce a composite image of the clothing item in the store and the clothing item in the person's existing wardrobe overlaid onto the image of the person.

In another embodiment of the present invention, the image of the clothing item is embedded in the clothing tag itself. In this embodiment, the image of the clothing item is compressed and encoded as a pattern of dots or stripes, such as bar coding, on the clothing tag. The scanner reads the pattern of dots or stripes from the clothing tag. The PDA application software then uses an algorithm that decompresses and decodes the pattern of dots or stripes to construct an image of the clothing item. This eliminates the need of having to retrieve the clothing item image from a database.

BRIEF DESCRIPTION OF THE DRAWINGS

Other aspects and advantages of the invention will become apparent upon reading the following detailed description of the preferred embodiments and upon reference to the drawings in which.

DETAILED DESCRIPTION OF THE PREFERRED EMBODIMENTS

Figure 1:
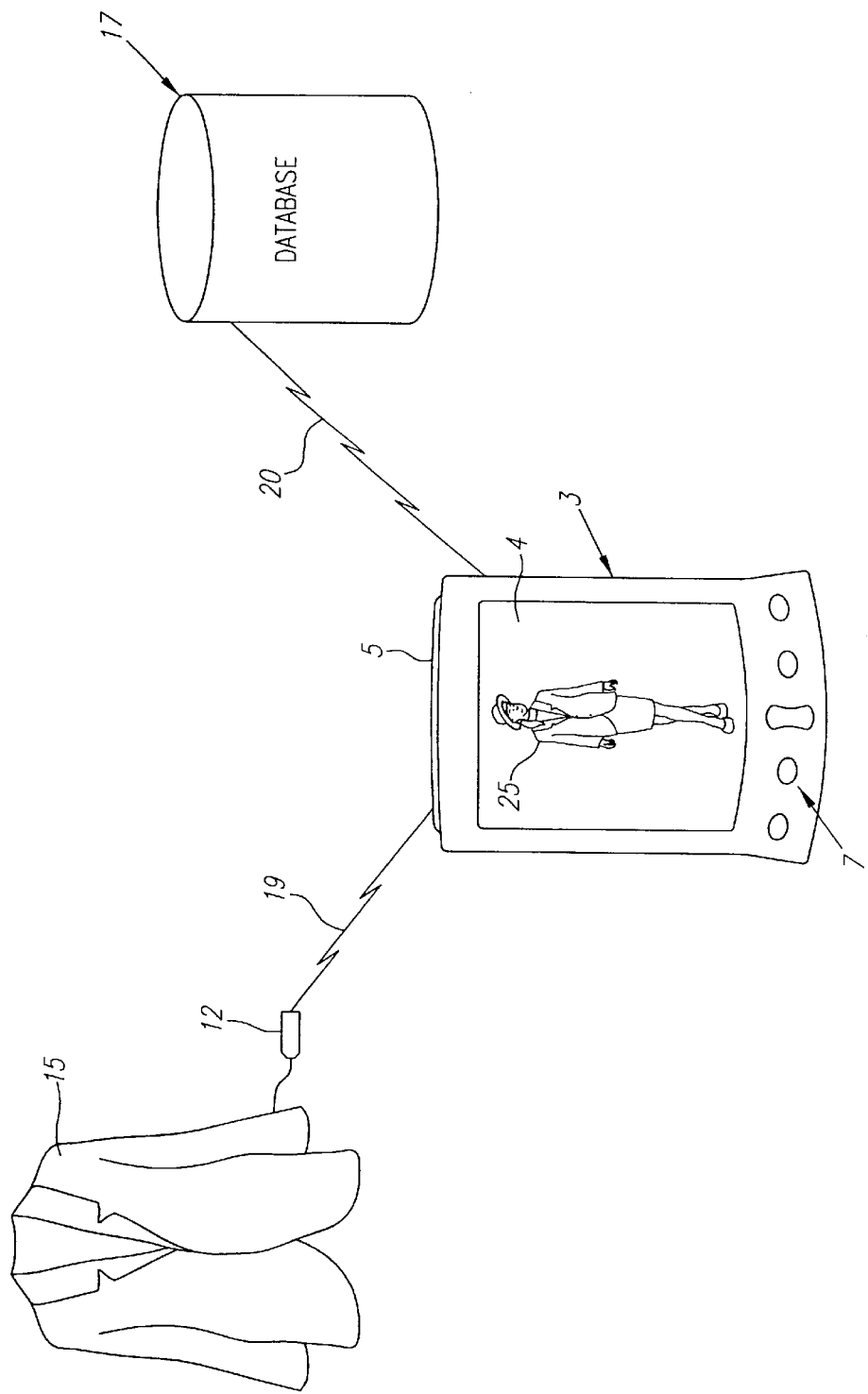
FIG. 1 shows a wardrobe previewing system according to one embodiment of the invention.

FIG. 1 shows a wardrobe previewing system 1 according to one embodiment of the invention. The system 1 includes a Personal Digital Assistant (PDA) 3 having a memory and wireless Internet capability. The PDA 3 is readily available commercially, and may be any PDA model, such as a Palm Pilot™ PDA. The system 1 also includes clothing item tags 12, wherein each tag 12 contains a clothing item ID identifying a clothing item 15. For simplicity, only one tag 12 and one clothing item 15 are shown in FIG. 1. The system 1 further includes a remote database 17 for storing clothing item images, preferably in digital form, wherein each clothing item image corresponds to one of the clothing item IDs on the tags 12.

The PDA 3 includes a scanner 5 capable of reading the clothing item IDs from the tags 12, a display 4, and a set of buttons 7. The clothing item ID may be a bar code or any other type of identifier such as an RF tag or a magnetic tag. The scanner 5 is therefore configured in accordance with the particular clothing item ID used on the tag 12, and may be, for example, a laser scanner adapted to read bar codes. The PDA 3 further includes application software stored locally in the PDA memory for enabling the PDA 3 to display a preview of clothing items on a person. In addition, an image of the person is stored in the PDA memory.

To preview a clothing item using the PDA 3, the person scans 19 the clothing tag 12 of the clothing item 15 with the scanner 5. The scanner 5 reads the clothing item ID from the tag 12. The PDA application software then transmits the read clothing item ID from the PDA 3 to the database 17 via a wireless Internet link 20. The database 17 retrieves the clothing item image corresponding to the read clothing item ID, and transmits the retrieved clothing item image to the PDA 3. The PDA application software overlays the retrieved clothing item image onto the image of the person stored in memory to produce a composite image. The PDA application software then displays the composite image 25 on the display 4 to give the person a preview of how the clothing item will look on her.

Figure 2:
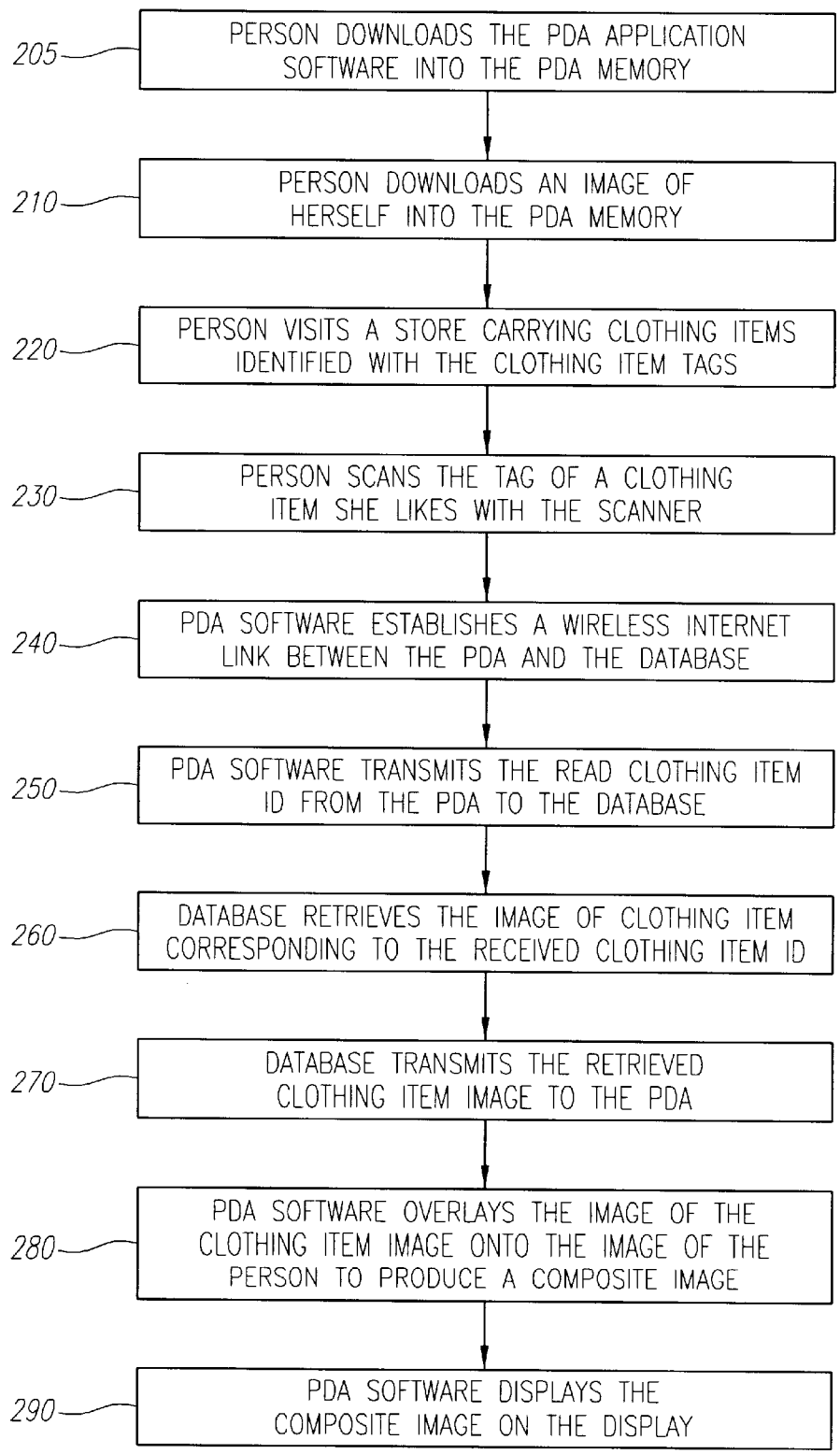
FIG. 2 is a flowchart of steps for previewing a clothing item on a person according to one embodiment of the invention.

The steps for previewing a clothing item on the person according to the present invention will now be described in detail with reference to FIG. 2.

First, in step 205, the person downloads the PDA application software into the PDA memory for enabling the PDA 3 to preview clothing items on the display 4. The PDA software can be downloaded into the PDA memory from various sources including but not limited to a web site on the Internet.

In step 210, the person downloads an image of herself into the PDA memory. The image of the person, which is preferably in digital form, can be scanned from a photograph or taken with a digital camera. Preferably, the person downloads the image of herself in a predetermined pose that matches a predetermined pose for the clothing item images in the database 17. The PDA application software may include an image of a model in the predetermined pose to illustrate the predetermined pose to the person on the display 4. The image of the person can be stored in various formats including but not limited to a bitmap.

In step 220, the person visits a store carrying clothing items that are each identified with a clothing item tag 12. However, it is understood that the tag does not have to be a temporary attachment to the item of clothing. The tag containing the image information may be a permanent tag, such as the interior tag located on the back inside of the collar. In step 230, the person scans the tag 12 of the clothing item 15 she likes with the scanner 5. The scanner 5 reads the clothing item ID from the tag 12. The clothing item ID can identify the clothing item 15 by specifying a Uniform Resource Locator (URL) of a file in the database 17 containing the image of the clothing item 15. The clothing item ID can also identify the clothing item 15 by specifying a Universal Product Code (UPC) of the clothing item, which is typically used by cash registers to identify the clothing item.

In step 240, the PDA application software establishes a wireless Internet link between the PDA 3 and the database 17. In step 250, the PDA application software transmits the read clothing item ID 250 from the PDA 3 to the database 17. In step 260, the database 17 retrieves the image of the clothing item corresponding to the received clothing item ID. In step 270, the database 17 transmits the retrieved clothing item image to the PDA 3.

In step 280, the PDA software overlays the retrieved clothing item image onto the image of the person to produce a composite image 25. The image of the person was taken in a predetermined pose in step 210 so that the image of the person matches the clothing item image in the composite image 25. In step 290, the PDA application software displays the composite image 25 on the display 4 to show the person how the clothing item will look on her. This allows the person to quickly preview the clothing item 15 on her without having to put on the clothing item 15 and stand in front of a mirror.

Preferably, the PDA's memory has enough memory space to store several clothing item images received by the database 17. That way, a clothing item image can be stored in the PDA memory for later use without having to be reloaded from the database 17. The PDA application software, preferably, gives the person the option of displaying clothing item stored in the PDA memory on the display 4. In addition, the PDA application software, preferably, allows the person to select and preview any clothing items already stored in the PDA memory using the buttons 7. This enables the person to quickly preview a previously scanned clothing item without having to rescan or reload the clothing item. In addition, this enables the person to quickly compare two or more previously scanned clothing items on the display 4 to decide which one looks best on her. In one embodiment, the PDA application software enables the PDA 3 to display two or more different composite images on the display 4 at the same time, such as an image of a pair of pants and a matching shirt. Alternatively, the PDA application software may display different composite images side-by-side on the display 4 so that the person can directly compare two or more clothing items, such as two shirts, to decide which one looks best on her.

An advantage of the present invention is that it allows a person to preview how a clothing item at a store will look with a clothing item in her existing wardrobe without having to bring the clothing item in her existing wardrobe to the store. For example, suppose the person wants to see how a shirt at a store will look with a pair of pants in her existing wardrobe. To do this, the person simply downloads the clothing image of her pants into the PDA memory before visiting the store. At the store, the person scans the tag 12 of the shirt. The PDA application software can then produce a composite image of the pants and shirt overlaid onto the image of the person to show the person how the shirt will look with the pants in her existing wardrobe.

In another embodiment, the PDA memory has enough memory space to store more than one image of the person. In addition, the PDA application software gives the person the option of selecting one of the images of her stored in memory to produce the composite image in step 280. This enables the person to preview how clothing items at a store will look on her with different clothing items in her existing wardrobe. To do this, the person downloads images of herself wearing different clothing in her existing wardrobe into the PDA memory before visiting the store. At the store, the person can then select which clothing item in her existing wardrobe to preview with a clothing item at the store by selecting which image of her stored in the PDA memory to produce the composite image.

In yet another embodiment, the PDA application software can produce a composite image using two or more clothing item images stored in the PDA memory. In addition, the PDA application software allows the person to select and preview a combination of clothing items stored in the PDA memory using the buttons 7. This allows the person to see how two or more scanned clothing items will look on her as an outfit. For example, suppose the person wants to see how a shirt and a pair of pants at a store will look on her as an outfit. The person can scan the tag 12 of the shirt and pants. After the images of the shirt and pants are downloaded into memory from the database 17, the person can select to preview a combination of the shirt and pants on her. The PDA application software overlays the images of the shirt and pants onto the image of the person to produce a composite image that shows a preview of how the shirt and pants will look on her as an outfit.

In still another embodiment, the present invention gives the person the option of previewing a clothing item in different colors without having to individually scan in the different colors. In this embodiment, the database 17 is able to recognize whether or not a clothing item is available in different colors. When the database 17 recognizes that a clothing item is available in different colors, the database 17 is able to retrieve images of that clothing item in the different colors.

Furthermore, in a preferred embodiment in which the tags 12 are permanently affixed to the article of clothing, a person may see a jacket on a friend that looks like it would match very nicely with an outfit in the person's wardrobe. The person can ask the friend if it would be OK to scan the tag 12. Once the tag 12 is scanned, the person can also call up a pre-scanned image of a pair of pants and a shirt from the person's wardrobe, to see how the ensemble of clothing will appear. Thus, it is understood that the use of the present system is not limited to new clothing that is being displayed in a store. Rather, this system can be implemented for any article of clothing that provides a tag 12 according to the present system.

Figure 3:
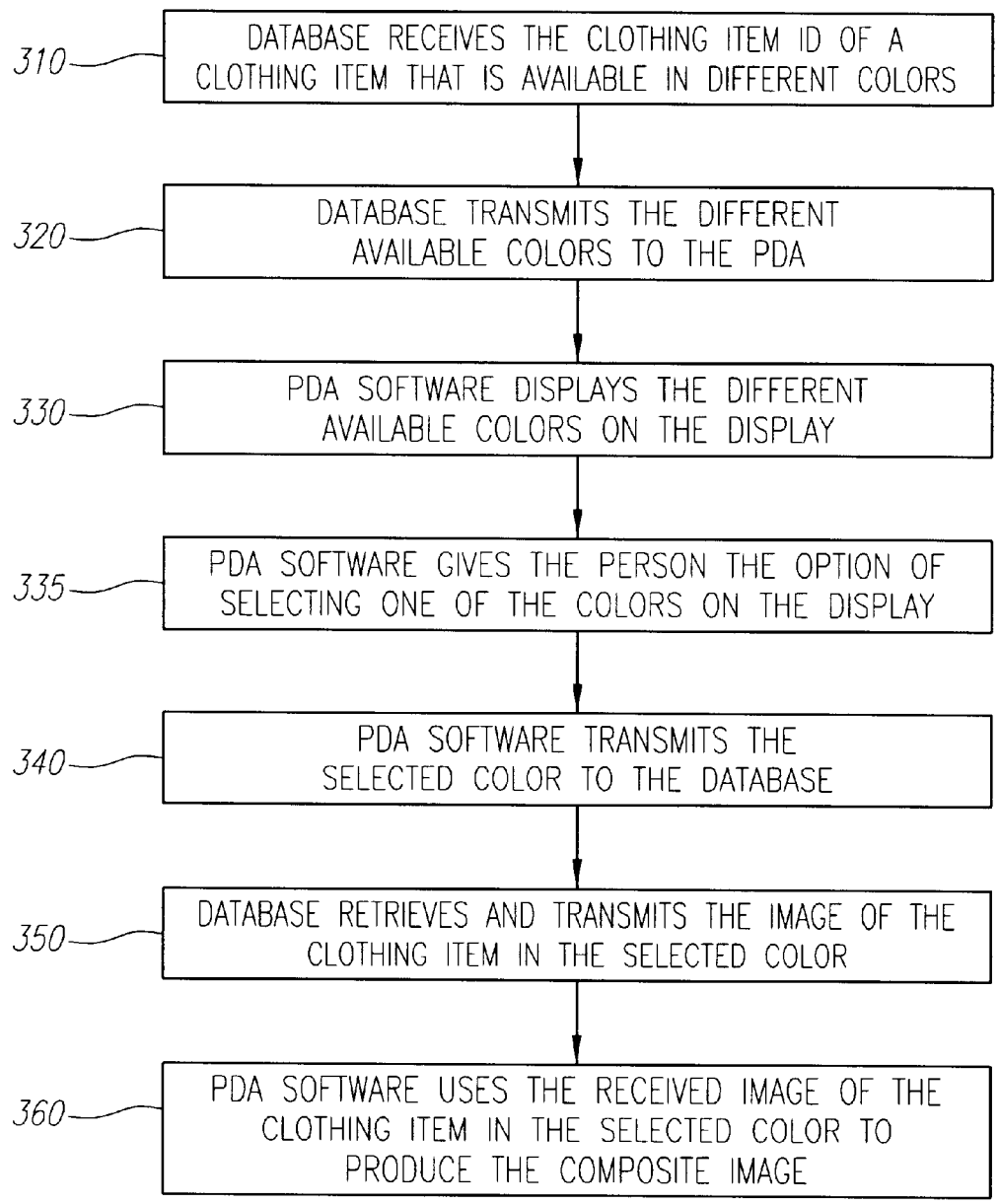
FIG. 3 is a flowchart of steps for retrieving images of a clothing item available in different colors according to one embodiment of the invention.

FIG. 3 shows the steps for retrieving images of a clothing item in different colors. In step 310, the database 17 receives the clothing item ID of a clothing item that is available in different colors from the PDA 3. In step 320, the database 17 recognizes that the clothing item is available in different colors and transmits the different available colors to the PDA 3. In steps 330 and 335, the PDA application software displays the different colors available on the display 4 and gives the person the option of selecting which color to preview. In step 340, the PDA application software transmits the selected color from the PDA 3 to the database 17. In step 350, the database 17 retrieves and transmits the image of the clothing item in the selected color to the PDA 3. In step 360, the PDA application software uses the image of the clothing item in the selected color to produce the composite image. If the person wishes to preview the same clothing item in another color, steps 330 through 360 can be repeated. This allows the person to quickly preview the same clothing item in different colors without having to individually scan in the different colors. Alternatively, for clothing items that are available in multiple colors, the software application can provide the person with the ability to take a "black and white" image of an article of clothing, and then to add a desired color to the image, in order to view the appearance of a particular article of clothing in a particular color.

Figure 4:
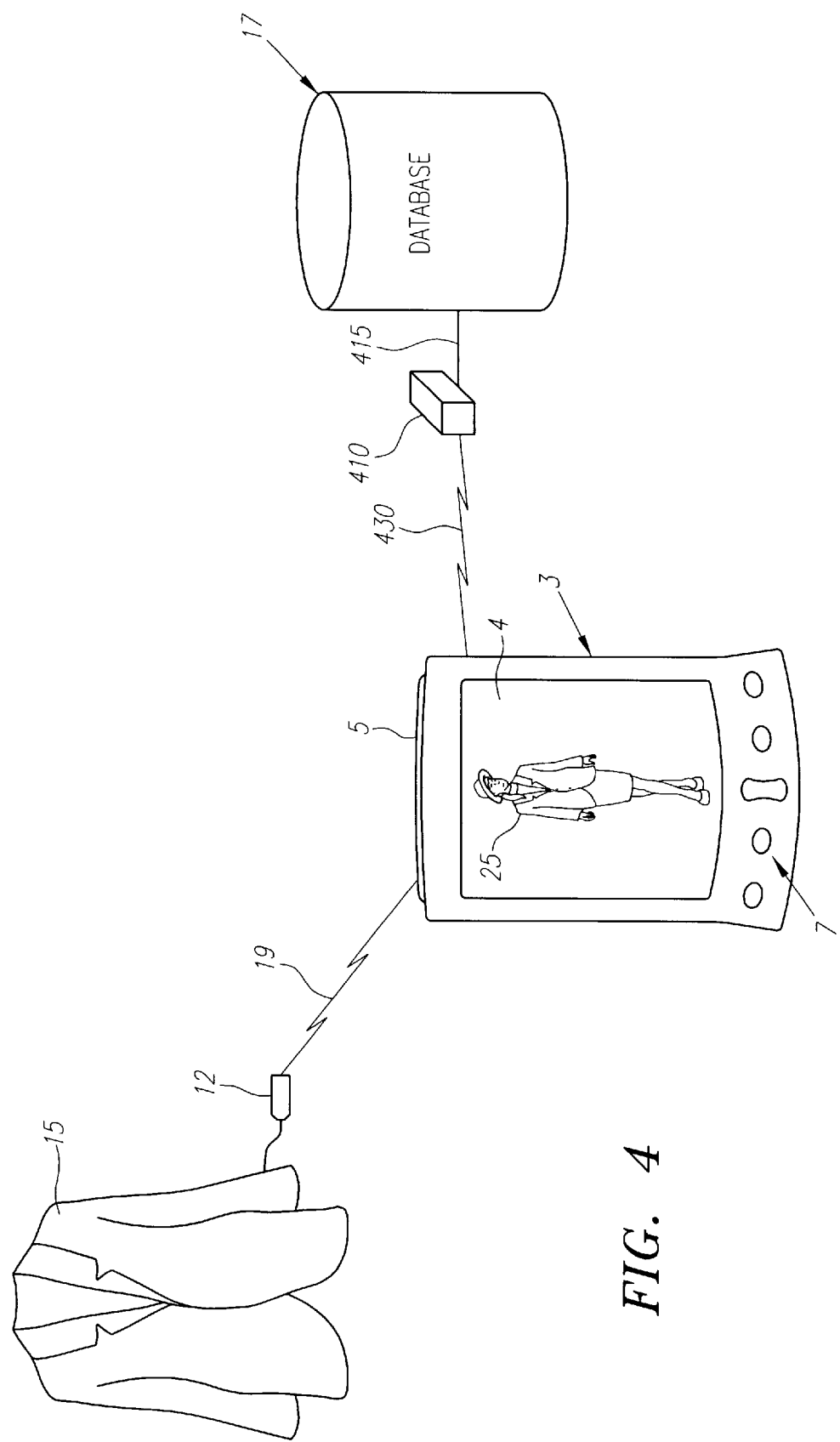
FIG. 4 shows a wardrobe previewing system according to another embodiment of the invention.

FIG. 4 shows another embodiment of the present invention in which the system 1 includes a remote access port 410 connected to the database 17 via a wireline link 415. The wireline link 415 can include but is not limited to a LAN, a PSTN, or a DSL link. In this embodiment, the PDA 3 includes a short range RF transceiver capable of establishing a wireless link 430 with the access port 410. A Bluetooth link can be used for the wireless link 430. In this embodiment, the PDA 3 communicates with the database 17 through the access port 410 and the wireline link 415. The advantage of this embodiment is that it can achieve a high-speed data connection between the database 17 and the PDA 3.

Figure 5:
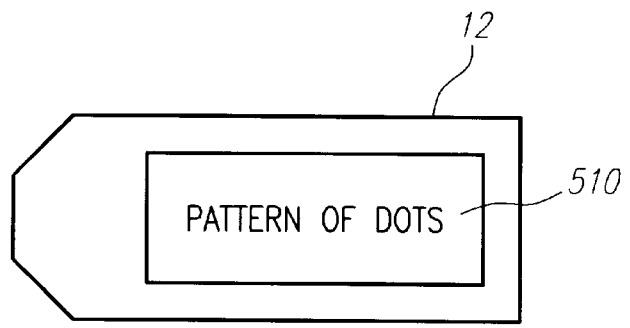
FIG. 5 shows a clothing item tag according to one embodiment of the invention.

FIG. 5 shows a clothing item tag 12 according to yet another embodiment of the present invention in which the clothing item image is embedded in the tag 12 itself. This eliminates the need to retrieve the clothing item image from the remote database 17. In this embodiment, each clothing item image is compressed and encoded as a pattern of dots 510 on one of the tags 12. The scanner 5 reads the pattern of dots 510 from the tag 12. The PDA application software then uses an algorithm that decompresses and decodes the pattern of dots 510 to retrieve the clothing item image.

Various algorithms have been developed for compressing and encoding digital data, such as images and text, as a pattern of dots on printed matter. One such algorithm, developed by INTACTA Technologies, Inc., compresses and encodes digital data as a pattern of dots that can be printed on paper or plastic, and can be read by a standard scanner. This technology can be accessed at www.intacta.com.

There are many advantages for embedding the clothing item image in the tag 12. One advantage is that the PDA 3 does not have to maintain a wireless Internet link with the database 17 to retrieve clothing item images. Another advantage is that scanning the clothing item image into the PDA 3 from the tag 12 can be faster than retrieving and downloading the clothing item image from a database 17. Furthermore, a database 17 need not be provided or maintained.

Another approach would be through the use of magnetic media in the clothing tag 12 such that an electronic strip reader could be used to create an image of the clothing item. Other approaches, such as bar codes, are contemplated within the scope of the present invention.

Figure 6:
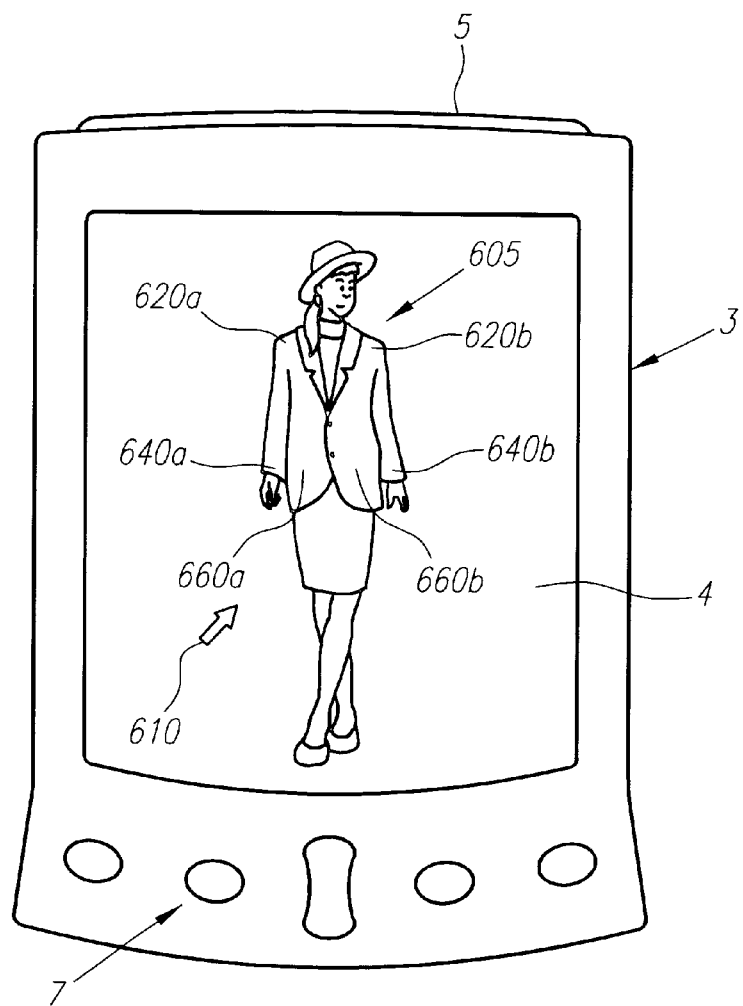
FIG. 6 shows a PDA display according to one embodiment of the invention.

FIG. 6 shows the PDA 3 according to still another embodiment of the present invention in which the PDA application software adjusts the position and proportions of the clothing item image to better fit the image of the person 605. In this embodiment, the PDA application software displays the image of the person 605 with a pointer 610 on the display 4. The PDA application software enables the person to move the pointer 610 within the image 605 using the buttons 7, or an input device, such as an input pen (not shown). The PDA application software also enables the person to mark off different body parts on the image 605 using the pointer 610 and an input device, such as the buttons 7.

In FIG. 6, for example, points 620a and 620b mark the position of the person's right and left shoulder, respectively, points 640a and 640b mark the position of the person's left and right wrist, respectively, and points 660a and 660b mark the position of the left and right side of the person's waist, respectively. When the person is finished marking off the image 605, the PDA application software stores the coordinates of the different body parts into the PDA memory. The coordinates of the different body parts can later be used to indicate the proportions of the person's body on the image 605. When the PDA 3 receives a clothing item image from the database 17, or from the clothing tag 12, the PDA application software adjusts the position and proportions of the clothing item image according to the coordinates of the different body parts. For example, the PDA application software can use the distance between the person's right shoulder and right wrist, points 620a and 640a, respectively, to adjust the sleeve length of a shirt image. Furthermore, the PDA application software can use the distance between the left and right side of the person's waist, points 660a and 660b, respectively, to adjust the width of the shirt image. Because the clothing item image is in digital form, the PDA application software can employ well known digital image processing techniques to adjust the proportions of the clothing item image.

The examples in FIG. 6 are used for illustrative purposes and are not intended to limit the different body parts that can be marked off according to this embodiment of the present invention. In addition, the proportions of the clothing item image do not have to be adjusted by the PDA application software. Instead, a processor at the database 17 can adjust the proportions of the clothing item image before transmitting the image to the PDA 3. This requires that the PDA 3 transmit the body position coordinates to the database 17. The advantage of this approach is that it reduces the processing requirements of the PDA 3.

Those skilled in the art will appreciate that various modification may be made to the just described preferred embodiments without departing from the spirit and scope of the invention. For example, even though the present invention was described using a PDA, one skilled in the art will appreciate that other portable devices can be used, such as a palmtop computer. Therefore, the invention is not to be restricted or limited except in accordance with the following claims and their legal equivalents.

What is claimed is:

1. A method for previewing how a clothing item will look on a person using a portable device having a memory, a display, and a scanner, wherein the clothing item has an associated tag comprising a clothing item ID, and an image of the person is capable of being stored in the memory, comprising the steps of:

reading the clothing item ID from the tag of the clothing item with the scanner;

accessing a clothing item image based upon the read clothing item ID;

overlaying the retrieved clothing item image onto the image of the person stored in the memory to produce a composite image; and displaying the composite image on the display.

2. The method of claim 1, wherein the clothing item ID is a code capable of being scanned by said portable device and processed by an application running on said portable device to render the clothing item image.

3. The method of claim 1, further comprising the steps of:

reading the clothing item ID from the tag of a second clothing item with the scanner;

accessing a second clothing item image based on the clothing item ID of the second clothing item;

overlaying the accessed second clothing item image onto the image of the person stored in the memory to produce a second composite image; and displaying the first and the second composite image on the display at the same time.

4. The method of claim 1, further comprising the steps of:

reading the clothing item ID from the tag of a second clothing item with the scanner;

accessing a second clothing item image based on the clothing item ID of the second clothing item;

overlaying the accessed first and second clothing item image onto the image of the person stored in the memory to produce a second composite image; and displaying the second composite image on the display.

5. The method of claim 1, wherein more than one image of the person is stored the memory, and the method further comprises the steps of:

giving the person the option of selecting one of the images of the person stored in the memory; and overlaying the retrieved clothing item image onto the image of the person selected by the person to produce the composite image.

6. The method of claim 1, wherein the step of retrieving a clothing item image comprises the steps of:

establishing a wireless link between the portable device and a database;

transmitting the read clothing ID item from the portable device to the database;

accessing the clothing item image from the database based on the transmitted clothing item ID; and transmitting the accessed clothing item image from the database to the portable device.

7. The method of claim 6, wherein the wireless link is a wireless Internet link.

8. The method of claim 7, wherein the clothing item ID specifies a URL of a file in the database containing the clothing item image.

9. The method of claim 6, further comprising the steps of:

recognizing whether or not a clothing item of the read tag is available in different colors; and when it is recognized that the clothing item is available in different colors, executing the steps of:

displaying the different colors in which the clothing item is available on the display;

giving the person the option of selecting one of the different colors on the display;

transmitting the color selected by the person from the portable device to the database;

retrieving a clothing item image in the selected color from the database;

transmitting the clothing item image in the selected color from the database to the portable device; and overlaying the retrieved clothing item image in the selected color onto the image of the person stored in the memory to produce the composite image.

10. The method of claim 1, wherein the step of retrieving a clothing item image comprises the steps of:

establishing a wireless link between the portable device and an access port;

establishing a link between the access port and a database;

transmitting the read clothing ID item from the portable device to the database through the access port;

retrieving a clothing item image from the database based on the transmitted clothing item ID; and transmitting the retrieved clothing item image from the database to the portable device through the access port.

11. The method of claim 10, wherein the link between the access port and the database is a wireline link.

12. The method of claim 1, further comprising the steps of:

displaying the image of the person stored in the memory on the display;

enabling the person to mark off different body parts on the image of the person;

storing coordinates of the body parts marked off by the person into the memory; and adjusting proportions of the accessed clothing item image according to the coordinates of the body parts marked off by the person.

13. The method of claim 1, further comprising the steps of:

reading the clothing item image from the tag of a second clothing item with the scanner;

overlaying the read first and second clothing item image onto the image of the person stored in the memory to produce a second composite image; and displaying the second composite image on the display.

14. A method for previewing how a clothing item will look on a person using a portable device having a memory, a display, and a scanner, wherein an image of the clothing item is embedded in a tag and an image of the person is stored in the memory, comprising the steps of:

accessing the clothing item image from the tag of one of the clothing items by reading the tag with the scanner;

overlaying the read clothing item image onto the image of the person stored in the memory to produce a composite image; and displaying the composite image on the display.

15. The method of claim 14, wherein a coded representation of the clothing item image is embedded in the tag as a pattern of dots.

16. The method of claim 14, further comprising the steps of:

reading the clothing item from the tag of a second clothing item with the scanner;

overlaying the read second clothing item image onto the image of the person stored in the memory to produce a second composite image; and displaying the first and the second composite image on the display at the same time.

17. A computer program product for use in a portable device having a memory, a display, and a scanner, wherein an image of a person is stored in the memory, comprising:

an instruction for reading a clothing item ID from a clothing item tag with the scanner;

an instruction for accessing a clothing item image based on the read clothing item ID;

an instruction for overlaying the retrieved clothing item image onto the image of the person stored in the memory to produce a composite image; and an instruction for displaying the composite image on the display.

18. The computer instruction product of claim 17, further comprising:

an instruction for reading a clothing item ID from a second clothing item tag with the scanner;

an instruction for accessing a second clothing item image based on the clothing item ID of the second clothing item tag;

an instruction for overlaying the accessed second clothing item image onto the image of the person stored in the memory to produce a second composite image; and an instruction for displaying the first and the second composite image on the display at the same time.

19. The computer instruction product of claim 17, further comprising:

an instruction for reading a clothing item ID from a second clothing item tag with the scanner;

an instruction for accessing a second clothing item image based on the clothing item ID of the second clothing item tag;

an instruction for overlaying the accessed first and second clothing item image onto the image of the person stored in the memory to produce a second composite image; and an instruction for displaying the second composite image on the display.

20. The computer instruction product of claim 17, wherein more than one image of the person is stored the memory, and the computer instruction product further comprises:

an instruction for giving the person the option of selecting one of the images of the person stored in memory; and an instruction for overlaying the accessed clothing item image onto the image of the person selected by the person to produce the composite image.

21. A computer instruction product for use in a portable device having a memory, a display, and a scanner, wherein an image of a person is stored the memory, comprising the steps of:

an instruction for reading and rendering a clothing item image embedded in a clothing item tag with the scanner;

an instruction for overlaying the read clothing item image onto the image of the person stored in the memory to produce a composite image; and an instruction for displaying the composite image on the display.

22. The computer instruction product of claim 21, wherein the clothing item image is embedded in the clothing item tag as a pattern of dots, and the computer instruction product further comprises an instruction for converting the pattern of dots into the clothing item image.

* * * * *